United States Patent
Kim (10) Patent No.: US 10,352,378 B2
(45) Date of Patent: Jul. 16, 2019

(54) METHOD AND DEVICE FOR CALIBRATING ENGINE CLUTCH DELIVERY TORQUE OF HYBRID VEHICLE

(71) Applicants: Hyundai Motor Company, Seoul (KR); Kia Motors Corporation, Seoul (KR)

(72) Inventor: Do Hee Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 15/603,749

(22) Filed: May 24, 2017

(65) Prior Publication Data

US 2018/0172090 A1 Jun. 21, 2018

(30) Foreign Application Priority Data

Dec. 15, 2016 (KR) .................. 10-2016-0171932

(51) Int. Cl.
*F16D 48/06* (2006.01)
*B60K 6/387* (2007.10)
*F16D 48/00* (2006.01)

(52) U.S. Cl.
CPC ............... *F16D 48/06* (2013.01); *B60K 6/387* (2013.01); *F16D 48/00* (2013.01);
(Continued)

(58) Field of Classification Search
CPC ........... F16D 48/06; F16D 2500/30404; F16D 2500/30412; F16D 2500/30415;
(Continued)

(56) References Cited

U.S. PATENT DOCUMENTS 8,571,767 B2 * 10/2013 Porta ................. F16D 48/06
477/166
8,612,104 B2 * 12/2013 Kojima ............... F16D 48/0206
192/3.51
8,744,705 B2 * 6/2014 Thor .................. F16D 48/06
192/3.61

(Continued)

FOREIGN PATENT DOCUMENTS

KR 2010-0048584 A 5/2010
KR 2013-0136779 A 12/2013

*Primary Examiner* — David R Morris
(74) *Attorney, Agent, or Firm* — Mintz Levin Cohn Ferris Glovsky and Popeo, P.C.; Peter F. Corless (57) ABSTRACT

A method for calibrating engine clutch delivery torque of a hybrid vehicle includes: determining an engagement control amount of an engine clutch which connects an engine with a driving motor or disconnects the engine from the driving motor based on a difference between speeds of the engine and the driving motor; determining a current delivery torque corresponding to the engagement control amount of the engine clutch that controls the engine clutch to be in a lock-up state and a temperature of the engine clutch; extracting a previous delivery torque that corresponds to the engagement control amount that controls the engine clutch to be in the lock-up state and the temperature and is included in a map table; and applying a weighted value to each of the extracted previous delivery torque and the determined current delivery torque to calibrate the delivery torque included in the map table.

7 Claims, 8 Drawing Sheets (52) U.S. Cl.
CPC ....... *B60Y 2200/92* (2013.01); *B60Y 2300/42* (2013.01); *B60Y 2400/42* (2013.01); *F16D 2500/106* (2013.01); *F16D 2500/10412* (2013.01); *F16D 2500/10443* (2013.01); *F16D 2500/3065* (2013.01); *F16D 2500/3067* (2013.01); *F16D 2500/30404* (2013.01); *F16D 2500/30412* (2013.01); *F16D 2500/702* (2013.01); *Y02T 10/6286* (2013.01); *Y02T 10/6295* (2013.01); *Y10S 903/914* (2013.01); *Y10S 903/946* (2013.01)

(58) Field of Classification Search
CPC . F16D 2500/30421; F16D 2500/30426; F16D 2500/3065; F16D 2500/3067; F16D 2500/50236; F16D 2500/702; F16D 2500/70205; F16D 2500/70252; F16D 2500/70211; F16D 2500/70217
See application file for complete search history.

(56) References Cited

U.S. PATENT DOCUMENTS

| | | | | |
|---|---|---|---|---|
| 8,874,339 | B2* | 10/2014 | Yoon | F16D 48/06 701/67 |
| 9,108,636 | B2* | 8/2015 | Terakawa | B60K 6/48 |
| 9,790,871 | B2* | 10/2017 | Iizuka | F16H 61/02 |
| 2010/0138121 | A1* | 6/2010 | Porta | F16D 48/06 701/68 |
| 2011/0004380 | A1* | 1/2011 | Kojima | F16D 48/0206 701/53 |
| 2013/0245904 | A1* | 9/2013 | Thor | F16D 48/06 701/55 |
| 2013/0317683 | A1* | 11/2013 | Terakawa | B60K 6/48 701/22 |
| 2014/0121924 | A1* | 5/2014 | Yoon | F16D 48/06 701/67 |
| 2015/0127242 | A1* | 5/2015 | Iizuka | F16H 61/02 701/110 |

* cited by examiner

| Engagement control amount for engine clutch | $k_1$ | $k_2$ | $k_3$ | $k_4$ | ... | $k_k$ |
|---|---|---|---|---|---|---|
| Speed difference | 0 | $V_1$ | $V_2$ | $V_3$ | ... | $V_j$ |
| | \multicolumn{6}{c|}{Increase of speed difference →} |

| | Temperature | | | | |
|---|---|---|---|---|---|
| | | $t_1$ | $t_2$ | $t_3$ | ... | $t_j$ |
| Engagement control amount for engine clutch<br><br>Increasing direction ↓ | $k_1$ | $a_{11}$ | $a_{12}$ | $a_{13}$ | | $a_{1j}$ |
| | $k_2$ | $a_{21}$ | $a_{22}$ | $a_{23}$ | | $a_{2j}$ |
| | $k_3$ | $a_{31}$ | $a_{32}$ | $a_{33}$ | ... | $a_{3j}$ |
| | ... | | | ... | ... | |
| | $k_i$ | $a_{i1}$ | $a_{i2}$ | $a_{i3}$ | | $a_{ij}$ |

METHOD AND DEVICE FOR CALIBRATING ENGINE CLUTCH DELIVERY TORQUE OF HYBRID VEHICLE

CROSS-REFERENCE TO RELATED APPLICATION

This application claims under 35 U.S.C. § 119(a) the benefit of Korean Patent Application No. 10-2016-0171932 filed in the Korean Intellectual Property Office on Dec. 15, 2016, the entire contents of which are incorporated herein by reference.

BACKGROUND

(a) Technical Field

The present disclosure relates to a hybrid vehicle (or a hybrid electric vehicle), more particularly, to a method and a device for calibrating engine clutch delivery torque of the hybrid vehicle.

(b) Description of the Related Art

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of the motor.

The hybrid vehicle can include the engine, the motor, an engine clutch to adjust power between the engine and the motor, a transmission, a differential gear apparatus, a battery, a starter-generator that starts the engine or generates electricity by output of the engine, and wheels.

Further, the hybrid vehicle can include a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator may be referred to as an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

It is possible to ensure drivability of the hybrid vehicle by engaging the engine clutch after a speed of the engine and a speed of the motor are synchronized to maintain a constant torque during power transmission between the engine and the motor, when changing from the EV mode to the HEV mode.

However, it is necessary to control the engine clutch to slip and be engaged under driving conditions when the battery is maintained in a low state of charge (SOC), when the temperatures of the battery and the motor are above a reference temperature condition, and when the road that the vehicle travels on has a steep slope. Additionally, it is necessary to control the pressure of the clutch to control the engine clutch to slip under such driving conditions.

Delivery torque of the engine clutch, which is torque transmitted by physical contact of two friction members that are included in the engine clutch, can be estimated from hydraulic pressure supplied to the engine clutch and the friction coefficient of the friction members.

Controlling the engine clutch is an important factor that determines the drivability and the fuel consumption in operation of the hybrid vehicle. The friction coefficient can be changed by a deviation in hydraulic pressure depending on a current provided to a solenoid valve operating the engine clutch, aging of the solenoid valve, and degradation of the friction members. A change of the friction coefficient can cause a deviation in the delivery torque of the engine clutch.

As described above, it is difficult to precisely control the engine clutch in the hybrid vehicle because a deviation is generated by deterioration of the parts included in the engine clutch, thereby decreasing drivability and fuel economy. Accordingly, it may be necessary to correct the deviation by learning the delivery torque of the engine clutch in the hybrid vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method and a device for calibrating engine clutch delivery torque of a hybrid vehicle which are capable of eliminating a hydraulic pressure sensor which detects a state of an engine clutch by learning and updating the delivery torque in a transient period (or a transient time interval) of the engine clutch engagement based on a temperature of the engine clutch or a speed difference between a speed of an engine and a speed of a driving motor.

An exemplary embodiment of the present disclosure may provide the method for calibrating engine clutch delivery torque of the hybrid vehicle, including: determining, by a controller, an engagement control amount of an engine clutch which connects an engine with a driving motor or disconnects the engine from the driving motor based on a difference between speeds of the engine and the driving motor; determining, by the controller, a current delivery torque corresponding to the engagement control amount of the engine clutch that controls the engine clutch to be in a lock-up state and a temperature of the engine clutch; extracting, by the controller, a previous delivery torque that corresponds to the engagement control amount that controls the engine clutch to be in the lock-up state and the temperature and is included in a map table; and applying, by the controller, a weighted value to each of the extracted previous delivery torque and the determined current delivery torque to calibrate a delivery torque included in the map table.

The method for calibrating engine clutch delivery torque of the hybrid vehicle may further include: determining, by the controller, whether a condition for learning a delivery torque of the engine clutch is satisfied. The determining the engagement control amount may proceed when the condition is satisfied.

A weighted value applied to the extracted previous delivery torque may be greater than a weighted value applied to the determined delivery torque.

The engine clutch may include a wet type engine clutch.

An exemplary embodiment of the present disclosure may provide the device for calibrating engine clutch delivery torque of the hybrid vehicle, including: an engine clutch configured to connect an engine with a driving motor or disconnect the engine from the driving motor; and a controller configured to determine an engagement control amount of the engine clutch according to a difference between speeds of the engine and the driving motor. The controller may determine a current delivery torque corresponding to the engagement control amount of the engine clutch that controls the engine clutch to be in a lock-up state and a temperature of the engine clutch, may extract a previous delivery torque that corresponds to the engagement control amount that controls the engine clutch to be in the lock-up state and the temperature and is included in a map table, and may apply a weighted value to each of the extracted previous delivery torque and the determined current delivery torque to calibrate a delivery torque included in the map table.

A weighted value applied to the extracted previous delivery torque may be greater than a weighted value applied to the determined delivery torque.

The method and the device for calibrating engine clutch delivery torque of the hybrid vehicle according to the exemplary embodiment of the present disclosure may increase robustness of the engine clutch delivery torque learning by learning the delivery torque using the engagement control amount of the engine clutch while taking into account an influence of an environmental deviation (or a temperature deviation) or a mechanical deviation (e.g., a friction coefficient deviation).

A non-transitory computer readable medium containing program instructions executed by a processor may include: program instructions that determine an engagement control amount of an engine clutch which connects an engine with a driving motor or disconnects the engine from the driving motor based on a difference between speeds of the engine and the driving motor; program instructions that determine a current delivery torque corresponding to the engagement control amount of the engine clutch that controls the engine clutch to be in a lock-up state and a temperature of the engine clutch; program instructions that extract a previous delivery torque that corresponds to the engagement control amount that controls the engine clutch to be in the lock-up state and the temperature and is included in a map table; and program instructions that apply a weighted value to each of the extracted previous delivery torque and the determined current delivery torque to calibrate a delivery torque included in the map table.

The exemplary embodiment of the present disclosure may solve a problem of instability in the transient period by learning the delivery torque in the transient period based on the engagement control amount for the engine clutch. Therefore, since the hydraulic pressure sensor may be eliminated, manufacturing cost of the hybrid vehicle including the engine clutch may be reduced.

Further, since the exemplary embodiment of the present disclosure performs continuous delivery torque learning in consideration of the influence of the temperature deviation or the friction coefficient deviation, it may reduce a deviation of the engine clutch delivery torque according to characteristic of a hybrid vehicle or a deviation of the delivery torque according to deterioration of the engine clutch and may improve durability of the engine clutch.

BRIEF DESCRIPTION OF THE DRAWINGS

A brief description of the drawings will be provided to more sufficiently understand the drawings which are used in the detailed description of the present disclosure.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

An engine clutch of a hybrid vehicle is an important intermediate component for supplying a power of an engine to a drive motor. The engine clutch contains many nonlinear elements because the engine clutch transmits the power by friction. A coefficient of friction of the engine clutch is greatly affected by a temperature of the engine clutch and a difference in a slip speed of the engine clutch. The difference in the slip speed may correspond to a speed difference between a speed of the engine and a speed of the drive motor. An actuator (e.g., a hydrostatic clutch actuator) engaging the engine clutch is affected by the temperature. Nonlinearity of the friction coefficient according to the temperature and the speed difference between the engine speed and the motor speed and nonlinearity of the actuator according to the temperature is a transient phenomenon generated at the beginning of engagement of the engine clutch. There are many quality problems such as an engagement impact of the engine clutch and over temperature in the engine clutch because of the nonlinearity. In order to solve these problems, a wet type engine clutch checks a transient delivery torque of the engine clutch at the beginning of engagement of the engine clutch using a hydraulic pressure sensor. However, inaccuracy of the sensor due to instability of the sensor and a cost increase due to addition of the sensor may occur.

In the related art, Korea Patent Publication No. 10-2010-0048584, which is incorporated by reference herein, detects a plurality of clutch delivery torque characteristics using a delivery torque map determined in advance by a test, estimates delivery torque of the clutch at a present time point, and selects the delivery torque of the map closest to the estimated torque to calibrate delivery torque of the clutch. The related art relates to an engine clutch that is engaged by a hydraulic pressure, but is vulnerable to a deviation according to a vehicle and an environmental deviation (or a temperature deviation) because the related art is a predetermined mapping based control.

In the related art, Korea Patent Publication No. 10-2013-0136779, which is incorporating by reference herein, drives a motor when a delivery torque learning condition of an engine clutch is satisfied to maintain a predetermined relative speed between an engine in a no-load state and the motor, engages an engine clutch using a control pressure exceeding a kiss point, measures the motor torque included in delivery torque of the engine clutch, and compares the measured torque with a basic model value so that the related art learns the delivery torque. The related art requires a condition in which a transmission is in a park stage or a neural stage and a vehicle is in a stopped state in order to learn the delivery torque. Thus, learning is performed only in a limited situation and a learning value in the limited situation can be used as a representative value.

A coefficient of friction of an engine clutch such as a wet type engine clutch is affected by temperature of the engine clutch and a speed difference between a speed of an engine and a speed of a drive motor. The speed difference between the speed of the engine and the speed of the drive motor may correspond to a difference between speeds of two friction members included in the engine clutch. An engine clutch actuator such as a hydraulic actuator is influenced by characteristic of the actuator, temperature of the engine clutch, or the difference between speeds of the engine and the drive motor.

Delivery torque of the engine clutch is determined according to a correlation (i.e., the delivery torque=a friction coefficient x the clutch engagement force) between the friction coefficient and the clutch engagement force. Thus, it is important to understand an influence of the friction coefficient and the clutch engagement force. It is important to understand the delivery torque characteristics of the engine clutch at the beginning of engagement of the engine clutch because the delivery torque has the greatest nonlinearity at the beginning of the engagement. Therefore, it is necessary to learn the delivery torque based on the temperature and the speed difference which affect the delivery torque.

Figure 1:
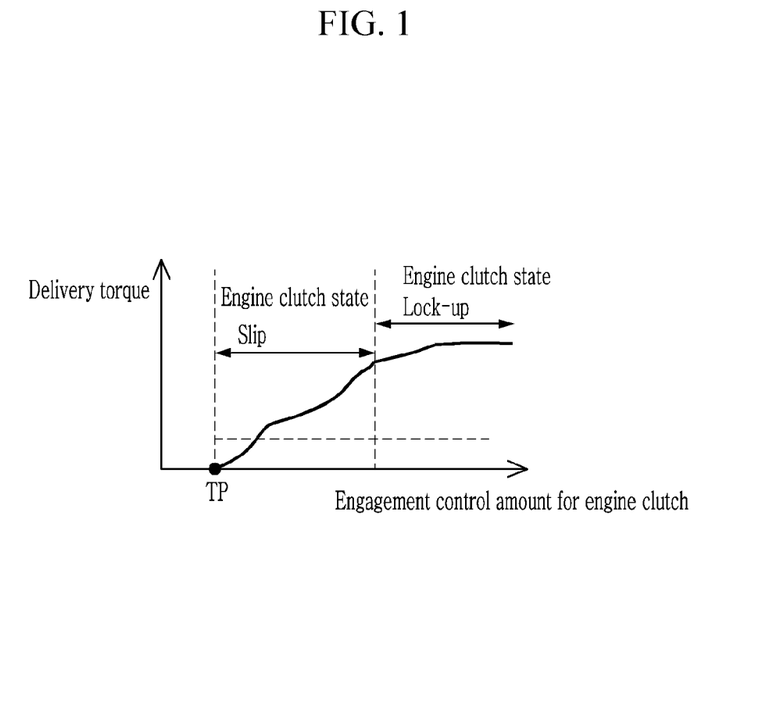
FIG. 1 is a graph for explaining a change of delivery torque according to an engagement control amount of an engine clutch shown in FIG. 8.
Figure 8:
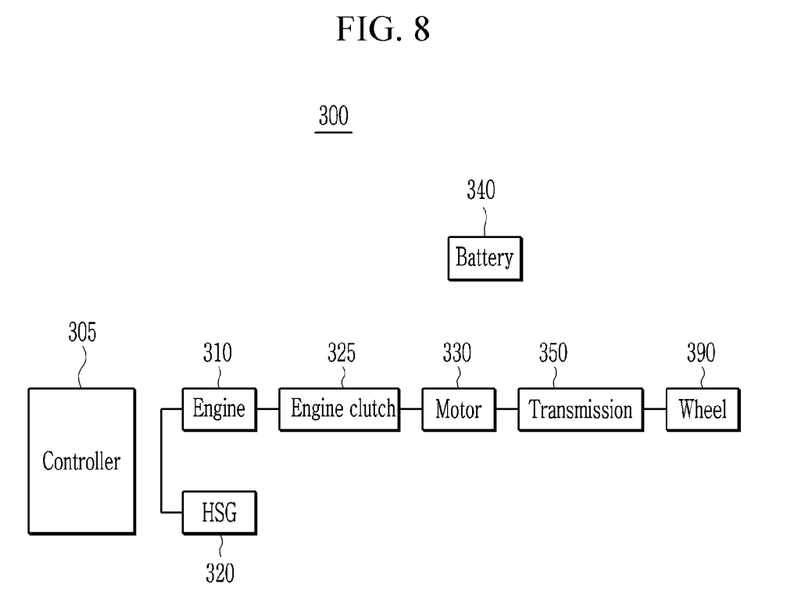
FIG. 8 is a block diagram illustrating the hybrid vehicle to which the method for calibrating engine clutch delivery torque is applied according to an exemplary embodiment of the present disclosure.

FIG. 1 is a graph for explaining a change of delivery torque according to an engagement control amount (or an engagement force) of an engine clutch shown in FIG. 8.

Referring to FIGS. 1 and 8, engagement of the engine clutch 325 is started with an increase in the engagement control amount of the engine clutch so that the engine clutch is in a lock-up state through a slip state. In the lock-up state, shafts of an engine 310 and a motor (or a driving motor) 330 may be driven as a single rigid body.

The reference symbol "TP" shown in FIG. 1 may mean a touch point and may indicate a kiss point of the engine clutch 325. The slip state of the clutch 325 may mean a state in which the clutch starts friction and a speed difference between both ends of the engine clutch is above a predetermined value. The lock-up state of the clutch may mean a state in which there is no speed difference between both ends of the engine clutch, and 100% torque applied to the input of the clutch is transferred to output of the clutch. An open state of the clutch may mean a state in which both ends do not interfere with each other and the clutch is physically separated.

The kiss point may be a starting point of torque delivery, and may be pressure of a fluid that converts a state of the clutch into the slip state in which the clutch starts to frictionally engage. The kiss point may mean an initial hydraulic pressure by which torque is started to be transmitted as two friction members included in the clutch 325 are in contact with each other. The kiss point may be used for control to switch a driving mode of a hybrid vehicle from an electric vehicle (EV) mode to a hybrid electric vehicle (HEV) mode. The slip state of the clutch 325 may be started at the kiss point.

Figure 2:
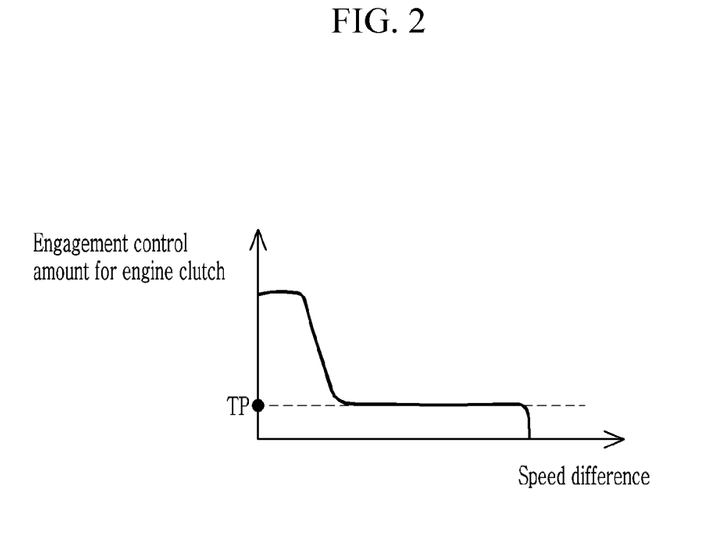
FIG. 2 is a graph explaining the engagement control amount for the engine clutch according to a difference between speeds of the engine and the motor shown in FIG. 8.
Figure 3:
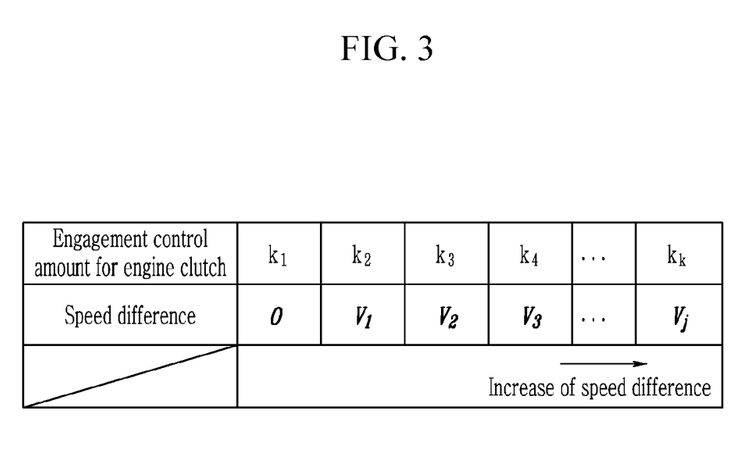
FIG. 3 is a map table corresponding to the engagement control amount according to the difference between speeds of the engine and the motor shown in FIG. 2.

FIG. 2 is a graph explaining the engagement control amount for the engine clutch according to a difference between speeds of the engine and the motor shown in FIG. 8. FIG. 3 is a map table corresponding to the engagement control amount according to the difference between speeds of the engine and the motor shown in FIG. 2.

Referring to FIGS. 2 and 3, an initial value of the engagement control amount may be determined by a test, and the engagement control amount may include the kiss point. The engagement control amount according to the difference between speeds of the engine and the motor may be used to determine a map table including delivery torque of the engine clutch.

The engine 310 and the driving motor 330 may be engaged (or connected) using the engine clutch 325 so that the kiss point is learned. An example of kiss point learning of an engine clutch is disclosed in Korean Patent Registration No. 10-1371461, which is incorporated by reference herein.

The hybrid vehicle may operate the engine clutch in order to transmit power or separate power between the driving motor and the engine for switching a mode of the vehicle. Operation hydraulic pressure of the engine clutch determining an operation of the engine clutch may considerably influence drivability, power performance, and fuel efficiency of the hybrid vehicle, so that the operation hydraulic pressure of the engine clutch needs to be accurately controlled.

The operation hydraulic pressure of the engine clutch may be determined by initial hydraulic pressure by which torque is started to be transmitted as both ends of friction members (or friction materials) of the engine clutch are in contact with each other, and feedback hydraulic pressure for adjusting the hydraulic pressure of the engine clutch by receiving feedback of speeds of the engine and the driving motor. The initial hydraulic pressure point may be called the kiss point.

The kiss point may be changed during the use of the engine clutch. Accordingly, it is necessary to control hydraulic pressure of the engine clutch so that the engine clutch may transmit the torque at an appropriate point by learning the kiss point.

Figure 4:
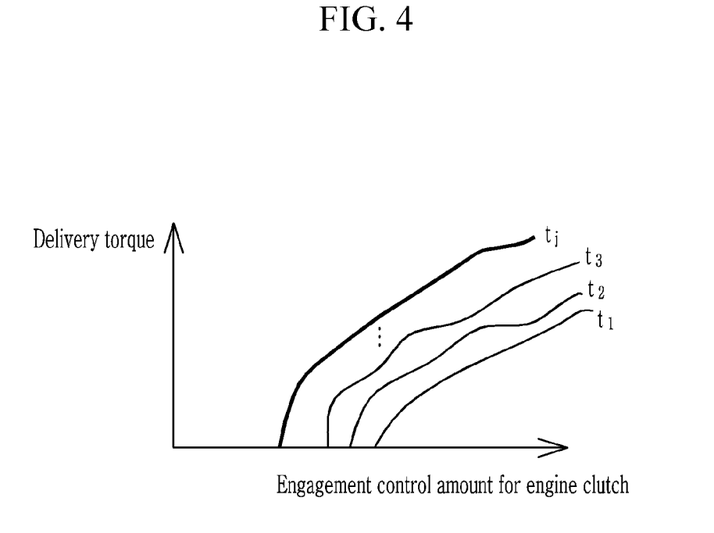
FIG. 4 is a graph explaining delivery torque of the engine clutch according to the engagement control amount of the engine clutch shown in FIG. 8 and the temperature of the engine clutch.
Figure 5:
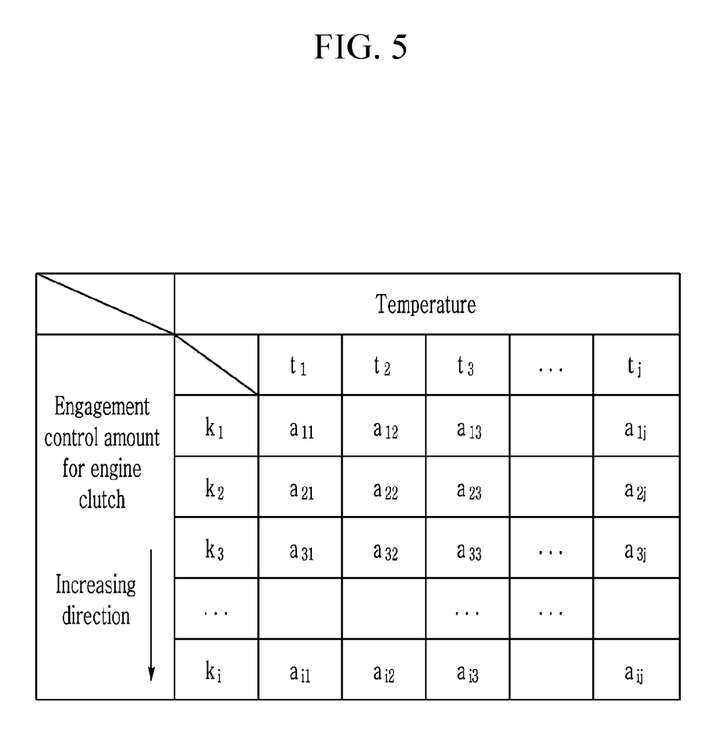
FIG. 5 is a map table corresponding to delivery torque of the engine clutch according to the engine clutch engagement control amount shown in FIG. 4 and the engine clutch temperature.

FIG. 4 is a graph explaining delivery torque of the engine clutch according to the engagement control amount of the engine clutch shown in FIG. 8 and the temperature of the engine clutch. FIG. 5 is a map table corresponding to the delivery torque of the engine clutch according to the engine clutch engagement control amount shown in FIG. 4 and the engine clutch temperature.

Referring to FIGS. 4, 5, and 8, an initial value of the map table including the delivery torque of the engine clutch may be set to a value obtained by determining delivery torque according to the engine clutch engagement control amount and the temperature by a test.

The delivery torque included in the map table may be used as a value for controlling torques of the engine and the driving motor of the hybrid vehicle 300 according to torque required by a driver of the vehicle. The map table (e.g., a memory) may be contained within a controller 305 or may be disposed outside the controller.

Figure 6:
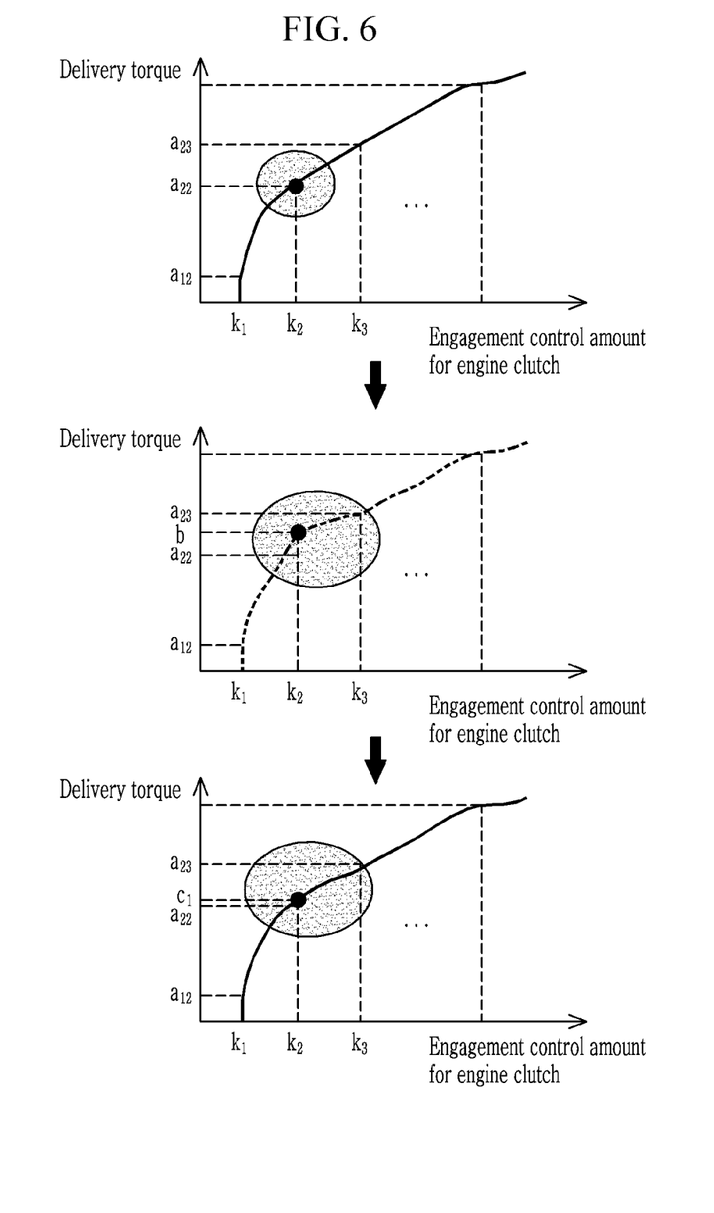
FIG. 6 is a series of graphs explaining a method of calibrating delivery torque based on the temperature of the engine clutch and the engagement control amount of the engine clutch which occur when the engine clutch is engaged according to an exemplary embodiment of the present disclosure.

FIG. 6 is a series of graphs explaining a method of calibrating (or learning) delivery torque based on the temperature of the engine clutch and the engagement control amount of the engine clutch which occur when the engine clutch is engaged according to an exemplary embodiment of the present disclosure.

Referring to FIG. 6, a newly learned delivery torque corresponding to the temperature and the engine clutch engagement control amount that are used during engagement of the engine clutch 325 shown in FIG. 8 may be partially reflected in a calibrated (or updated) delivery torque by a weight update method. A ratio reflected in the calibrated delivery torque of the new delivery torque may be adjusted. The adjusted reflection ratio may reduce a disharmony (or a sense of difference) due to calibration of delivery torque. Delivery torque may be changed to the new delivery torque when a value similar to the new delivery torque is repeatedly detected (or updated).

An update process of delivery torque $a_{22}$ corresponding to a temperature t2 of the engine clutch and an engagement control amount $k_2$ of the engine clutch shown in FIG. 5 is described as follows with reference to FIG. 6.

A reflection ratio (or a calibration variable) of the new delivery torque value reflected in the delivery torque $a_{22}$ may be, for example, 20%.

A first update value $c_1$ of delivery torque may be calculated as follows when the new delivery torque value that is first detected is b.

$$0.8 \times a_{22} + 0.2 \times b = c_1$$

A second update value $c_2$ of delivery torque may be calculated as follows when the new delivery torque value that is second detected is b.

$$0.8 \times c_1 + 0.2 \times b = 0.8 \times (0.8 \times a_{22} + 0.2 \times b) + 0.2 \times b = 0.64 \times a_{22} + 0.36 \times b = c_2$$

A third update value $c_3$ of delivery torque may be calculated as follows when the new delivery torque value that is third detected is b.

$$0.8 \times c_2 + 0.2 \times b = 0.8 \times (0.64 \times a_{22} + 0.36 \times b) + 0.2 \times b = 0.512 \times a_{22} + 0.488 \times b = c_3$$

Therefore, a reflection ratio of the new delivery torque value may become greater when the number of engagement of the engine clutch 325 is increased so that the update continues.

Figure 7:
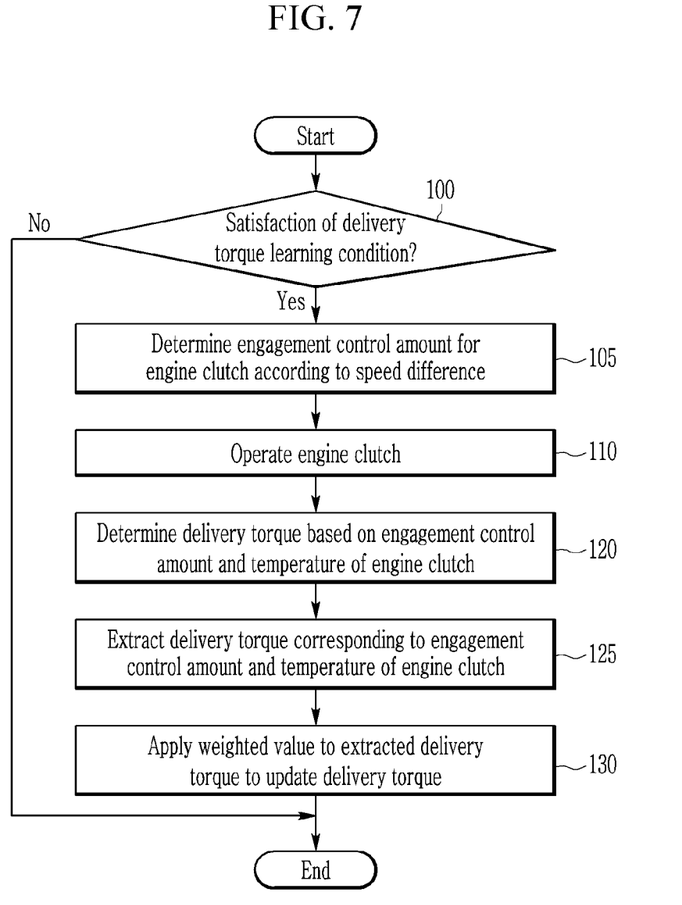
FIG. 7 is a flowchart explaining a method for calibrating engine clutch delivery torque of a hybrid vehicle according to an exemplary embodiment of the present disclosure.

FIG. 7 is a flowchart explaining a method for calibrating engine clutch delivery torque of the hybrid vehicle according to an exemplary embodiment of the present disclosure. FIG. 8 is a block diagram illustrating the hybrid vehicle to which the method for calibrating engine clutch delivery torque is applied according to an exemplary embodiment of the present disclosure.

Referring to FIGS. 7 and 8, in a determination step 100, the controller 305 may determine whether a condition for learning delivery torque of the engine clutch 325 is satisfied. The delivery torque learning condition is described as follows. A gear shift stage of a transmission 350 may be a drive stage (D stage). A state of charge (SOC) of a battery 340 is within a specific range and a charging limit value and a discharging limit value of the battery may be greater than or equal to a specific value. The engine clutch 325 may include a wet type engine clutch. The delivery torque of the engine clutch 325 may be used as information (e.g., hydraulic pressure supplied to the engine clutch) for engagement of the engine clutch that is required when the hybrid vehicle 300 is traveling in the HEV mode. The hydraulic pressure may prevent clutch engagement shock of the engine clutch.

For example, the controller 305 may be one or more microprocessors operated by a program or hardware including the microprocessor. The program may include a series of commands for executing the method for calibrating engine clutch delivery torque of the hybrid vehicle according to an exemplary embodiment of the present disclosure, which will be described below.

The hybrid vehicle 300 includes the controller 305, the engine 310, a hybrid starter-generator (HSG) 320, the engine clutch 325, the motor 330 which may be an electric motor, the battery 340, the transmission 350, and wheels (or driving wheels) 390. A device for calibrating engine clutch delivery torque of the hybrid vehicle may include the controller 305 and the engine clutch 325.

The hybrid vehicle 300, which is a hybrid electric vehicle, may use the engine 310 and the motor 330 as power sources, and includes the engine clutch 325 existing between the engine 310 and the motor 330 so that the hybrid vehicle 300 may be operated in an electric vehicle (EV) mode in which the hybrid vehicle 300 travels by the motor 330 in a state where the engine clutch 325 is opened, and in a hybrid electric vehicle (HEV) mode in which the hybrid vehicle 300 is capable of travelling by both the motor 330 and the engine 310 in a state where the engine clutch 325 is closed.

The hybrid vehicle 300 may include a power train of a transmission mounted electric device (TMED) type in which the motor 330 is connected to the transmission 350. The hybrid vehicle 300 may provide a driving mode, such as the EV mode, which is the electric vehicle mode using only power of the motor, and the HEV mode, which uses rotational force of the engine as main power and uses rotational force of the motor as auxiliary power depending on whether the engine clutch 325 that is disposed between the engine 310 and the motor 330 is engaged (or connected). In particular, in the hybrid vehicle 300 including a structure in which the motor 330 may be directly connected to the transmission 350, revolutions per minute (RPM) of the engine may be increased by drive of the HSG 320, power delivery and power cutoff between the engine and the motor may be performed via engagement and release of the clutch 325, a driving force may be transmitted (or transferred) to the wheels 390 through a power transmission system which may include the transmission 350, and torque of the engine may be transmitted to the motor via engagement of the clutch 325 when transmission of the engine torque is requested.

The controller 305 may include a hybrid control unit (HCU), a motor control unit (MCU), an engine control unit (ECU), and a transmission control unit (TCU).

The HCU may control starting of the engine 310 by controlling the HSG 320 when the engine stops. The HCU may be the highest controller, and may synthetically control controllers (for example, the MCU) connected to a network such as a controller area network (CAN) which is a vehicle network, and may control overall operation of the hybrid vehicle 300.

The MCU may control the HSG 320 and the motor 330. The MCU may control an output torque of the driving motor 330 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 340 into a three-phase alternating current (AC) voltage to drive the driving motor 330. The MCU may be disposed between the battery 340 and the motor 330.

The ECU may control a torque of the engine 310. The ECU may control an operating point (or a driving point) of the engine 310 through the network depending on a control signal output from the HCU, and may control the engine to output an optimal torque. The TCU may control an operation of the transmission 350.

The engine 310 may be a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 330 in the HEV mode.

The engine 310 may be connected to the motor 330 via the engine clutch 325 to generate a power transmitted to the transmission 350.

The HSG 320 may operate as a motor depending on a control signal output from the MCU to start the engine 310, and may operate as a generator in a state in which start of the engine 310 is maintained to provide generated electric power to the battery 340 via the inverter. The HSG 320 may be connected to the engine 310 through a belt. The HSG 320, which is a motor that cranks the engine, may be directly connected to the engine.

The engine clutch 325 may be disposed (or mounted) between the engine 310 and the driving motor 330, and may be operated to switch power delivery between the engine 310 and the motor 330. The engine clutch 325 may connect or intercept power between the engine and the motor depending on switching of the HEV mode and the EV mode. Operation of the engine clutch 325 may be controlled by the controller 305.

The engine clutch 325 may include a dry type engine clutch.

The motor 330 may be operated by a three-phase AC voltage that is output from the MCU to generate a torque. The motor 330 may be operated as a generator during coasting drive or regenerative braking to supply a voltage (or regenerative energy) to the battery 340.

The battery 340 may include a plurality of unit cells. A high voltage for providing a driving voltage (for example, 350-450 V DC) to the motor 330 that provides driving power to the wheels 390 or the HSG 320 may be stored in the battery 340.

The transmission 350 may include a multiple speed transmission, such as an automatic transmission or a dual clutch transmission (DCT), or a continuously variable transmission (CVT), and may shift to a desired gear by using hydraulic pressure depending on control of the TCU to operate engagement elements and disengagement elements. The transmission 350 may transmit driving force of the engine 310 and/or the motor 330 to the wheels 390, and may intercept power delivery between the motor 330 (or the engine 310) and the wheels 390.

According to a determination step 105, when the delivery torque learning condition is satisfied, the controller 305 may determine the engagement control amount of the engine clutch 325 based on the difference between speeds of the engine 310 and the driving motor 330. The engagement control amount of the engine clutch 325 may include the kiss point. The controller 305 may learn (or detect) the kiss point by combining the engine with the driving motor using the engine clutch.

According to an operation step 110, the controller 305 operates an actuator (e.g., a hydrostatic clutch actuator) that drives the engine clutch 325 using the engagement control amount to control the engine clutch 325 to be engaged.

According to a determination step 120, the controller 305 may determine a current delivery torque corresponding to an engagement control amount of the engine clutch that controls the engine clutch 325 to be in the lock-up state and a current temperature of the engine clutch. When a speed of the engine and a speed of the motor are synchronized after the engine clutch 325 is engaged, the controller 305 may determine a time of synchronization of the engine speed and the motor speed as a time when delivery torque of the engine clutch occurs. When the speed of the engine 310 and the speed of the motor 330 are synchronized, a state of the engine clutch 325 may be in the lock-up state.

According to an extraction step 125, the controller 305 may extract a previous delivery torque that corresponds to the engagement control amount that controls the engine clutch to be in the lock-up state and the current temperature and is included in the map table. A method by which the controller 305 learns the previous delivery torque may be similar to a method of determining the current delivery torque.

According to an update step 130, the controller 305 may apply a weighted value to each of the extracted previous delivery torque and the determined current delivery torque to update (or calibrate) a delivery torque (or the previous delivery torque) included in the map table. A weighted value applied to the extracted previous delivery torque may be greater than a weighted value applied to the determined delivery torque.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

What is claimed is:

1. A method for calibrating engine clutch delivery torque of a hybrid vehicle, comprising:
   determining, by a controller, an engagement control amount of an engine clutch which connects an engine with a driving motor or disconnects the engine from the driving motor based on a difference between speeds of the engine and the driving motor;
   determining, by the controller, a current delivery torque corresponding to the engagement control amount of the engine clutch that controls the engine clutch to be in a lock-up state and a temperature of the engine clutch;
   extracting, by the controller, a previous delivery torque that corresponds to the engagement control amount that controls the engine clutch to be in the lock-up state and the temperature and is included in a map table; and
   applying, by the controller, a weighted value to each of the extracted previous delivery torque and the determined current delivery torque to calibrate a delivery torque included in the map table,
   wherein the calibrated delivery torque is provided for engagement of the engine clutch when the hybrid vehicle is traveling in a hybrid electric vehicle mode.

2. The method of claim 1, further comprising:
   determining, by the controller, whether a condition for learning the delivery torque of the engine clutch is satisfied,
   wherein the determining the engagement control amount proceeds when the condition is satisfied.

3. The method of claim 1, wherein a weighted value applied to the extracted previous delivery torque is greater than a weighted value applied to the determined delivery torque.

4. The method of claim 1, wherein the engine clutch includes a wet type engine clutch.

5. A device for calibrating engine clutch delivery torque of a hybrid vehicle, comprising:
   an engine clutch configured to connect an engine with a driving motor or disconnect the engine from the driving motor; and
   a controller configured to determine an engagement control amount of the engine clutch according to a difference between speeds of the engine and the driving motor,
   wherein the controller determines a current delivery torque corresponding to the engagement control amount of the engine clutch that controls the engine clutch to be in a lock-up state and a temperature of the engine clutch, the controller extracts a previous delivery torque that corresponds to the engagement control amount that controls the engine clutch to be in the lock-up state and the temperature and is included in a map table, and the controller applies a weighted value to each of the extracted previous delivery torque and the determined current delivery torque to calibrate a delivery torque included in the map table.

6. The device of claim 5, wherein a weighted value applied to the extracted previous delivery torque is greater than a weighted value applied to the determined delivery torque.

7. A non-transitory computer readable medium containing program instructions executed by a processor, the computer readable medium comprising:
  program instructions that determine an engagement control amount of an engine clutch which connects an engine with a driving motor or disconnects the engine from the driving motor based on a difference between speeds of the engine and the driving motor;
  program instructions that determine a current delivery torque corresponding to the engagement control amount of the engine clutch that controls the engine clutch to be in a lock-up state and a temperature of the engine clutch;
  program instructions that extract a previous delivery torque that corresponds to the engagement control amount that controls the engine clutch to be in the lock-up state and the temperature and is included in a map table; and
  program instructions that apply a weighted value to each of the extracted previous delivery torque and the determined current delivery torque to calibrate a delivery torque included in the map table,
  wherein the calibrated delivery torque is provided for engagement of the engine clutch when the hybrid vehicle is traveling in a hybrid electric vehicle mode.

* * * * *